June 1, 1926.

J. S. DOOLY

PIE PAN

Filed April 30, 1925

1,587,288

INVENTOR
John S. Dooly.
By W. L. Dempsey,
ATTORNEY

Patented June 1, 1926.

1,587,288

UNITED STATES PATENT OFFICE.

JOHN S. DOOLY, OF ST. LOUIS, MISSOURI.

PIE PAN.

Application filed April 30, 1925. Serial No. 26,927.

My invention relates to pans for baking pies, and specifically to a plurality of sections detachably joined together into a single unit.

The object of my invention is to provide a pie baking pan in which equal and individual portions may be made and baked as a unit, so that the juices and fruits will be equally distributed when served and, also, to prevent the rapid drying up of the contents of a pie when cut or divided into individual portions.

Other and further objects and advantages will be apparent from the specification, claims and drawings.

Figure 1:
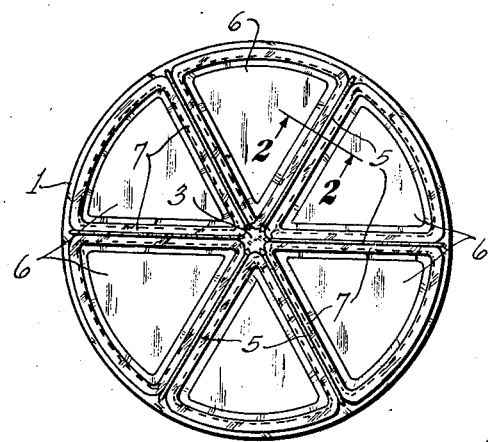
Fig. 1 is a plan view.
Figure 2:
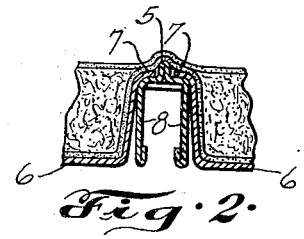
Fig. 2 is a cross section at 2—2.

Where pie is sold and served in individual portions, as is done in restaurants, cafeterias and other eating houses, the portions served often lack uniformity of size, the juices and fruits flow out of the crust and spread over the plate, and the unserved portions rapidly deteriorate in flavor and enticing qualities, because when the crusts are severed the contents is exposed to the drying effect of the air.

Again, several kinds of pies can be made and baked in the same tin where a small variety, such as two portions of apple, two of peach and two of apricot, is desired for a few persons living together and having different tastes. With the usual and ordinary pie pan, where several kinds of pies are desired, there must be made a whole pie of each kind desired.

To overcome the difficulties and objections above referred to, I have provided a single unit having a plurality of detachable pans, so that as above noted several kinds of individual portions can be made and baked as a whole pie and each retain its distinct flavor and quality.

Although various shapes can be readily made up of the individual units, my preferred method of construction comprises a wheel-like frame having an outer annular rim 1, a plurality of radially disposed spokes 2 spaced apart and connected at their outer ends to the rim as an integral part thereof and, likewise, joined at the geometrical center of the frame so as to form a hub-like portion 3. The frame is reinforced and strengthened at its periphery by a rim 4, shown in Fig. 4. The spokes are reinforced by longitudinal beads 5, embossed on the upper surfaces, which serve the further purpose of holding the individual units in fixed relation to each other, as shown in Fig. 5, and later described.

The embossed ribs or beads 5 serve the further purpose of providing a guide for dividing the pie into exactly equal portions.

The plurality of identical individual pie pans 6 are provided, of substantially triangular form except the base of the triangle is an arc instead of a straight line. The central portions of the pans 6 are depressed in dish form to provide a receptacle for the crust and filler, while the marginal edges of their straight sides are flanged, as shown at 7, to form a support for the pan when in place upon the frame, the flanges resting upon the spokes and the arc resting upon the annular rim, so that the dished portion of the pan occupies the space between the spokes and depends from the spokes a distance equal to the length of the supporting legs 8 of the frame. The legs 8, the annular rim 1, the spokes 2 and the hub portion 3 are all integral with each other, being stamped and formed of a single sheet of thin sheet metal.

Figure 4:
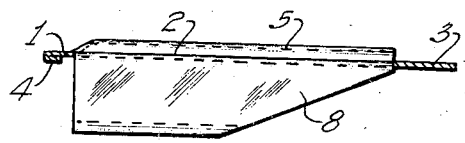
Fig. 4 is a section of containing body at 4—4.
Figure 5:
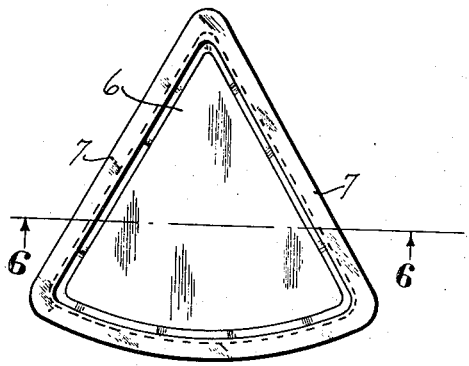
Fig. 5 is a plan view of a detachable section.
Figure 3:
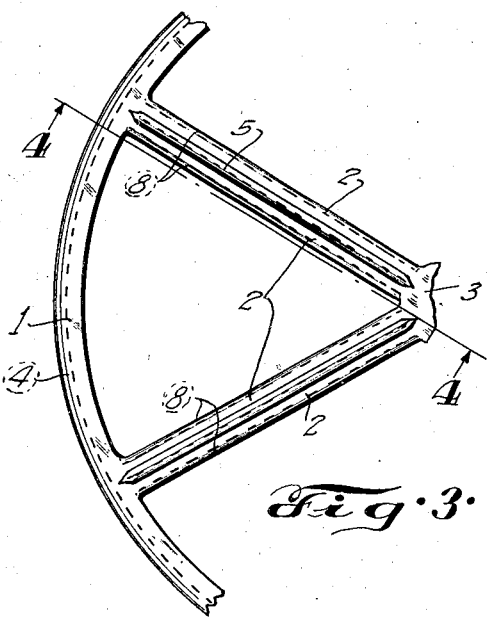
Fig. 3 is a plan view, broken away, of the containing body.
Figure 6:
Fig. 6 is a section of 5 at 6—6.

The flange 8, shown in Fig. 4 of the drawings, has its inner end cut away at an angle, because there is not sufficient metal to form a right angle when turned downwardly.

Having fully described my invention, what I claim as new and useful and for which I desire Letters Patent is:

A pie pan of the character described, comprising a frame consisting of a circular rim integral with a plurality of radially disposed members spaced apart at equal distances from each other and integrally joined together in the geometrical center of said frame, said radial members having their longitudinal marginal edges turned down at right angles to a horizontal plane and adapted to support the said frame in a horizontal plane, a plurality of identical individual pie pans adapted to rest upon said frame and adapted to fit the openings between the said radial members, so that the flanged marginal edges of the said individual pans lie parallel with the longitudinal axes of the said radial members.

In witness whereof I have hereunto affixed my signature.

JOHN S. DOOLY.